July 6, 1965
J. H. EBBINGHAUS
3,193,058
BREATHER BAG CONSTRUCTION
Filed Feb. 16, 1962
2 Sheets-Sheet 1
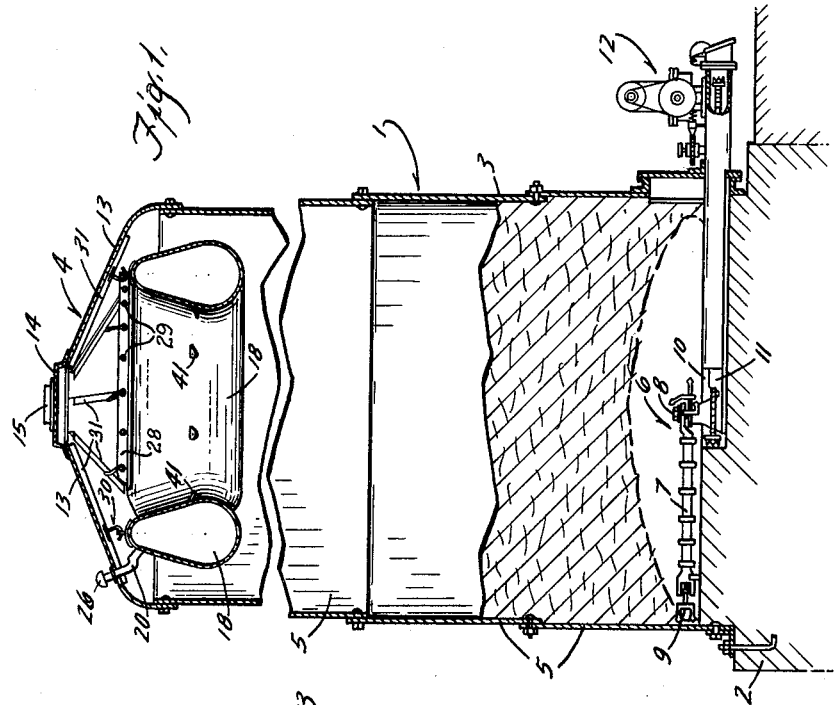
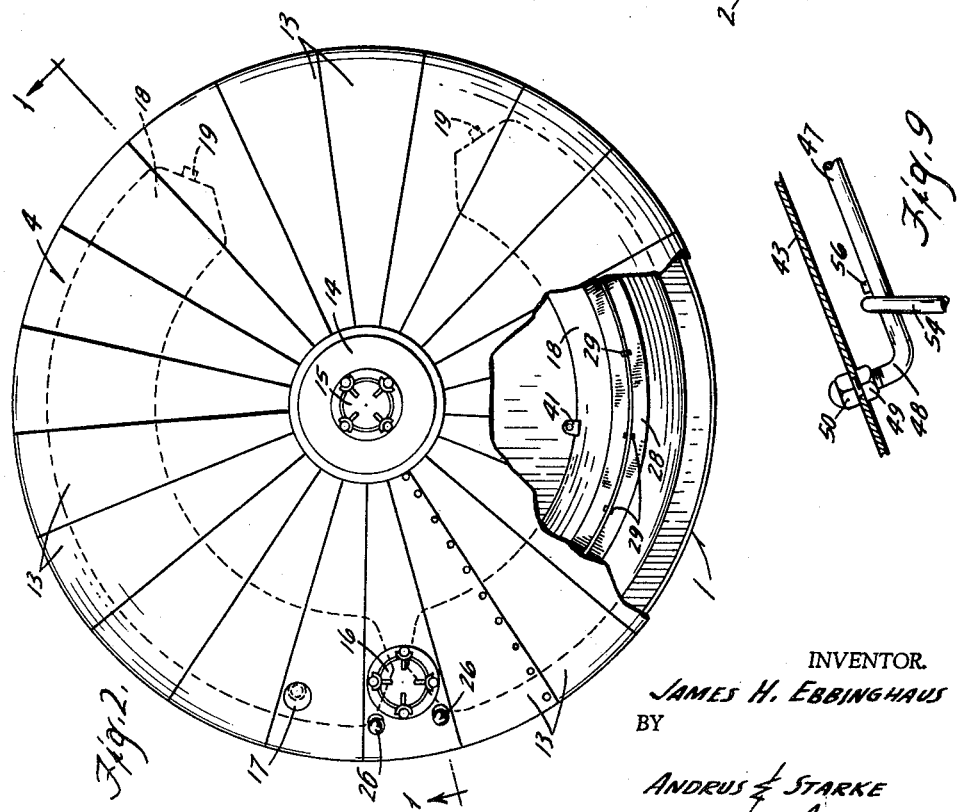
INVENTOR.
JAMES H. EBBINGHAUS
BY
ANDRUS & STARKE
ATTORNEYS.

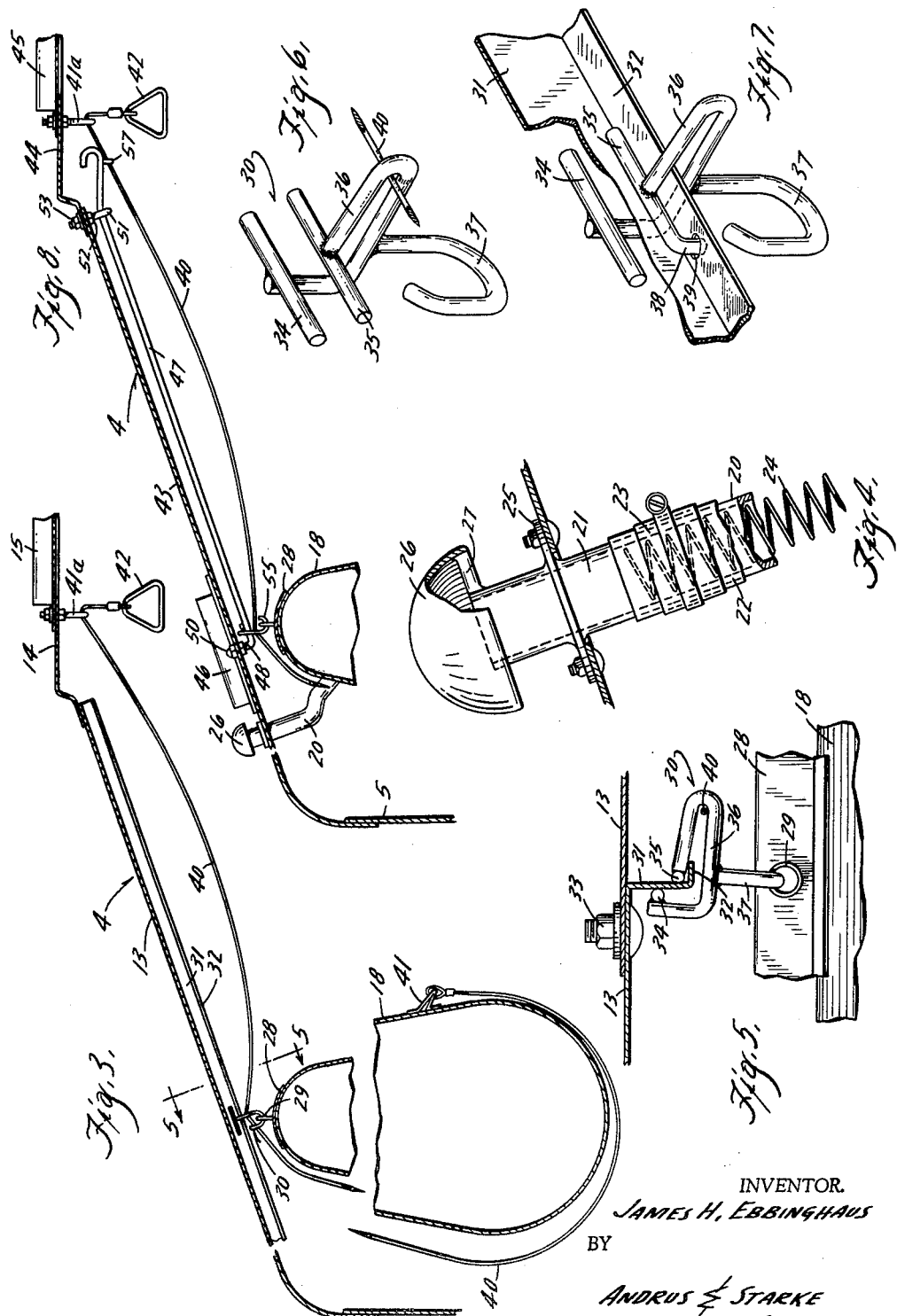

United States Patent Office 3,193,058
Patented July 6, 1965

3,193,058
BREATHER BAG CONSTRUCTION
James H. Ebbinghaus, Kankakee, Ill., assignor to A. O. Smith Harvestore Products, Inc., Kankakee, Ill., a corporation of Delaware
Filed Feb. 16, 1962, Ser. No. 173,637
7 Claims. (Cl. 189—3)

This invention relates to a storage structure and more particularly to an air-tight storage structure having a flexible bag to balance the internal pressure with the atmospheric pressure.

A storage structure such as a silo is subjected to widely varying temperature changes which in turn substantially affect the internal pressure of the structure. This is particularly true in air-tight silos. The temperature and consequent internal pressure changes are due primarily to normal daily temperature fluctuations and seasonal variations. Under conditions causing a decrease in internal pressure to a point below atmospheric pressure, there is a tendency for outside air to flow into the structure in order to establish an equalization of the pressures. Conversely, when the conditions cause a pressure increase in the structure in excess of atmospheric pressure, there is a tendency for the gases to flow out of the structure until such time as the pressure wtihin the structure equals that of the atmospheric pressure.

The silage or other food material stored within a silo respires and in most cases produces an appreciable amount of gas, including large quantities of carbon dioxide. If the carbon dioxide is retained within the silo so that oxygen is excluded, the process of fermentation will continue without spoilage of the silage. Should, however, carbon dioxide escape and a substantial amount of air replace the lost gas, the free oxygen will tend to promote mold growth in the silage and enhance spoilage.

In the past, breather bags have been used in combination with air-tight silos to provide a balance of pressure between the interior of the silo and the atmosphere. Generally, the breather bag is located within the upper end of the silo and the interior of the bag is connected to the atmosphere, while the external surface of the bag is subjected to the internal pressure within the structure. A decrease in internal pressure within the silo will cause an expansion of the bag, while the bag will respond to a pressure increase by contracting to thereby provide a constant equalization of internal and external pressures.

The present invention is directed to an improved breathing structure for an air-tight silo and includes one or more breather bags, each of which is curved throughout its length to conform to the curvature of the silo wall. The bags are located in the upper end of the silo and each bag has an outlet which is connected to an opening in the roof so that the interior of the bag is exposed to atmospheric pressure while the exterior is exposed to the pressure within the silo.

Each breather bag is suspended from the roof by a single yoke which is attached to the upper surface of the bag. The yoke includes a series of grommets which are engaged by hooks slidably mounted on rails that extend radially from the periphery of the roof to the center. A series of cords or cables are attached to the portion of each bag facing the center of the silo and the cords extend downwardly beneath the bag and upwardly around the outer surface of the bag and then radially to the center of the silo. By pulling on the cords, the breather bags can be pulled upward and then radially inward to the center of the silo where the bags can be removed for replacement or repair through a central filler opening.

Provision is also made to raise the bag within the silo without pulling the bag toward the center of the silo. To accomplish this, locks are provided on the hooks which engage the rails and prevent movement of the hooks on the rails. With the hooks in the locked position, pulling of the cords results in the bag being drawn upwardly against the roof in a position where it will not interfere with filling of the silo with silage.

The breather bag construction of the invention serves to balance the pressure between the interior and the exterior of the air-tight silo. The bag can be lifted upwardly against the roof in a location where it will not interfere with loading the silo, and if it is necessary to replace or repair the bag, the bag can be drawn radially inward to the center of the silo where it can be removed through the central filler opening. This feature is important for the silage within the silo generates substantial quantities of carbon dioxide so that a person cannot enter the silo without using auxiliary oxygen. However, with the invention it is possible, without entering the silo, to draw the breather bag upwardly to the central filler opening so that the bag can be readily removed from the silo.

The use of the single yoke prevents the bag, during periods of growth or expansion, from bearing against the roof panels. If a double suspension or radially spaced yokes are used, the portion of the bag between the points of suspension will bear against the roof panels during periods of growth or expansion with the result that the grommets or suspending mechanism may be subjected to excessive strain.

Other objects and advantages will appear in the course of the following description.

The drawings illustrate the best mode presently contemplated of carrying out the invention.

In the drawings:

FIGURE 1 is a vertical section taken on line 1—1 of FIGURE 2 employing the breather bag construction of the invention;

FIG. 2 is a top plan view of the silo with parts broken away in section;

FIG. 3 is an enlarged vertical section showing the details of the breather bag and hook connection;

FIG. 4 is an enlarged fragmentary section showing the details of the breather bag valve construction;

FIG. 5 is an enlarged fragmentary section taken along line 5—5 of FIG. 3 and also showing the hook construction;

FIG. 6 is a perspective view of a breather bag hook;

FIG. 7 is a perspective view of a modified hook having a locking end;

FIG. 8 is a fragmentary vertical section of the upper portion of a silo showing a modified form of the breather bag support; and FIG. 9 is an enlarged vertical section showing the connection of the outer ends of the rods to the roof.

The drawings illustrate a hermetically sealed or substantially air-tight storage structure 1, such as a silo, which is adapted to contain silage, haylage or other food material. The silo 1 is supported on a concrete foundation 2 and includes a generally cylindrical shell 3 enclosed by a roof 4. The shell 3 is formed of a series of generally curved plates 5 formed of steel or other materials. If the plates 5 are fabricated from steel, the plates may be coated on both sides with a vitreous enamel or glass coating to protect the exterior of the plates from deterioration due to weathering and to protect the interior surface of the plates from the corrosive effects of the stored material.

The silage or other stored material is removed from the silo by a bottom unloading apparatus 6 similar in structure and function to that described in the Tiedemann Patent 2,635,770. In general, the unloading apparatus includes a cutter arm 7 which is rotatably mounted on a central post 8 and rotates within the bottom of the silo. The cutter arm 7 carries an endless chain 9 having a series of teeth which cut or dislodge the silage and move the cut silage toward the center of the silo. The silage conveyed by the cutter chain is discharged into a radially extending trough 10 which contains a conveyor mechanism 11. The conveyor mechanism 11 conveys the cut silage to the exterior of the silo. The cutter arm, cutter chain and conveyor mechanism are all driven by a drive unit 12 located on the exterior of the silo. The unloading apparatus in itself forms no part of the present invention.

The roof 4 is composed of a series of segments 13 and a central cap 14 connects the inner ends of the segments at the center of the silo. A central filler hole is provided in the cap 14 and is enclosed by a cover 15 and a second filler hole is provided near the outer edge of the roof and this hole is also provided with a removable cover 16.

Excessive pressures which may be developed within the silo due to the generation of carbon dioxide are relieved by a conventional breather valve unit 17 which is secured within an opening in the roof 4.

To balance the internal and the external pressure, a pair of breather bags 18 are located in the upper end portion of the silo 1. The bags 18 are generally curved in length to conform to the curvature of the silo and each bag extends substantially halfway around the interior of the silo. Each of the bags 18 is provided with a pair of outlet tubes 19 at the ends thereof. One of the tubes 19 is closed off by a suitable plug and the other outlet tube is connected by a hose 20 to the lower end of an outlet pipe 21 which communicates with the exterior of the silo. As best shown in FIG. 4, the tube 19 is secured to the pipe 21 by a sleeve 22 made of plastic or the like which is located around the joint between the members, and a hose clamp 23 is secured around the sleeve and clamps the hose 20 to the pipe 21. To prevent crimping of the hose, a spring 24 is located within the pipe 21 and extends downwardly within the hose 20.

The outlet pipe 21 is secured to the roof 4 of the silo by means of a flange 25 on pipe 21 which is bolted to the roof panel segments 13. The upper end of the pipe 21 is enclosed by a generally curved cap 26 which is supported from the pipe 21 by a spider 27. The cap 26 prevents rain and other foreign materials from entering the outlet pipe 21 and the bag 18.

To suspend the bags in the silo, a yoke 28 is secured to the upper portion of each bag and extends substantially the length of the bag. The upstanding portion of the yoke 28 is provided with a series of grommets 29 which are engaged by slides 30 suspended from the roof 4. As best shown in FIG. 5, one longitudinal edge of each roof segment or panel 13 is provided with a downwardly extending flange 31 and an outwardly extending flange 32 which is substantially parallel to the segment 13. The adjacent edges of the roof segments 13 are secured in overlapping relation by bolts 33.

The flanges 31 and 32 provide a track or rail on which the slides 30 ride. Each slide 30 includes a pair of horizontal bars 34 and 35 and as best shown in FIG. 5, the bar 34 is disposed on one side of the flange 31 while the bar 35 is located on the opposite side of the flange 31. The bars 34 and 35 are connected by a bent central bar 36 which extends outwardly from bar 35 and is bent in a reverse bend beneath the flange 32 and then extends upwardly and is joined to the bar 34. A hook 37 is connected to the bar 36 and is adapted to engage the grommets 29 and yoke 28.

With this construction the slides 30 are able to slide along the flanges or ribs 31 in a radial direction toward the center or axis of the silo. The elongated bars 34 and 35 provide guides for the movement of the slides.

To lock the slides 30 with respect to the flange 32 or rail, a number of the slides 30 associated with each bag 18 have downwardly bent ends 38 on the horizontal bars 35. As shown in FIG. 7, the bent ends 38 are adapted to be received within holes 39 in the flange 32 of the roof panel. With the bent ends 38 in engagement with the holes 39, the slides 30 cannot move radially of the silo.

The bags 18 are adapted to be raised upwardly against the roof 4 when the slides are in the locked position and to be drawn radially inward toward the center of the silo, when the slides are in the unlocked position, by a series of cables 40. One end of each cable 40 is attached to a tab 41 which is connected to the inwardly facing surface of each bag 18. The cables 40 extend downwardly beneath the lower end of the bag and then upwardly along the outwardly facing side of the bag and through the bent bar 36 of the slides 30. The inner ends of the cables 40 pass through an eyebolt 41a secured to the cap 14 and the various cables associated with each bag 18 are connected to a common handle 42.

As the bags 18 hang downwardly a substantial distance within the silo, it is necessary that the bags be raised or elevated against the roof while the silo is being filled with silage. With the locking ends 38 engaged with the holes 39 in the flanges 32, pulling on the cables 40 will draw the bags upwardly against the roof panels. With the bags in the raised position, the silo can then be filled with silage.

In the event that it is necessary to remove the bag from the silo for replacement or repair, the filler cover 16 is initially removed and the locking ends 38 are disengaged from holes 39 by working manually through the filler opening such as with a bar or pole (not shown) having a hook on the end to engage and release ends 38 or by working similarly through the filler opening capped by cover 15. In addition, the outlet tube 19 is detached from the pipe 21. With the slides 30 in the unlocked position, the bags 18 can be drawn upwardly to the center of the silo by pulling on cables 40 and when the bags have reached the inward limit of travel, they can be conveniently removed through the central filler opening.

This construction eliminates the necessity of a person entering the silo to detach and remove the breather bags. The silage generates substantial quantities of carbon dioxide and after a period of only several days after the silo is filled, it is necessary to use auxiliary oxygen in order to enter the silo. Thus the present invention eliminates the problem of entering the silo and enables the bags to be drawn upwardly to the center of the silo and removed through the filler opening.

FIGS. 8 and 9 illustrate a modified form of the invention which is particularly adaptable to existing silos. In this embodiment the storage structure or silo 1 is provided with a roof 4 made up of a series of roof panels or segments 43. The inner ends of the panels 43 are connected by a circular cap 44 and access to the storage structure is provided by a central filler opening which is enclosed by a cover 45. As in the case of the first embodiment the roof is also provided with a second filler opening which is enclosed by a cover 46.

In this embodiment the breather bags 18 are suspended from a series of radially extending rods 47 which extend from the outer periphery of the roof toward the center. The outer end 48 of each rod 47 is bent generally normal to the body of the rod and is threaded and extends through an opening in the roof panels 43. A nut 49 is threaded on each of the rod ends 48 and is located against the inner surface of the roof panel while an acorn nut 50 is threadedly engaged with the end 48 and is located on the outer surface of the roof to firmly hold the rod to the roof.

The inner end of each rod 47 is supported by a threaded eye bolt 51 which extends through aligned openings in the roof panels 43 and cap 44. A nut 52 is threaded on the eye bolt and is located on the interior surface of the roof while an acorn nut 53 is engaged with the outer end of the eye bolt and is located on the outer surface of the cap 44.

The bags 18 are each supported by a series of eyebolt slides 54. The rods 47 extend through the openings in the respective slides 54, and the lower end of each slide is provided with a hook 55 which engages the grommets 29 of yoke 28.

A locking mechanism is provided to prevent inward or radial movement of the slides 54 and breather bags 18 when it is desired merely to raise or elevate the bags. The locking mechanism comprises a series of locking pins 56 which are secured to a number of the rods 47 and project upwardly therefrom. The locking pins engage the slides 54 and prevent radial movement of the slides along the rod.

Cords 40 are secured to the tabs 41 on the bags 18 and the cords, as in the case of the first embodiment, extend downwardly beneath the bag and upwardly along the outer surface of the bag. The inner ends of the cords pass through openings in lugs 57 attached to the inner ends of the rods 47 and through eyebolt 41a. The inner ends of the cords are attached to the common handle 42.

In order to draw the breather bags 18 inwardly toward the center of the silo for replacement or removal, the eyebolt slides 54 are initially moved over the locking pins 56 and the handle 42 is then pulled, causing the cords to draw the bags 18 and slides 54 inwardly along the rods 47 to the center of the silo where the bag can be removed.

The embodiment shown in FIGS. 8 and 9 is particularly adaptable to existing silos for the rods 47 can be readily installed in any type of roof construction.

In order to resist the corrosive effect of the silage contained within the silo, the slides, roof panels, rods and other components can be coated with vitreous enamel or glass.

The present invention provides a simple and inexpensive breather bag system in which the breather bags can be conveniently raised against the roof when the silo is being filled and which can be drawn to the center of the silo for removal or repair.

Various modes of carrying out the invention are contemplated as being within the scope of the following claims particularly pointing out and distinctly claiming the subject matter regarded as the invention.

I claim:

1. A storage structure, comprising
   (a) a silo,
   (b) a roof enclosing the upper end of the silo and having a central opening therein,
   (c) a breather bag located in the upper portion of the silo with the exterior surface of the bag exposed to the pressure of the interior of the silo,
   (d) a series of guide tracks connected to the roof and extending radially from the outer periphery of the roof toward the center thereof,
   (e) a movable member mounted for movement on each track,
   (f) a yoke member connected to the upper portion of said breather bag, one of said members having a hook and the other of said members having an opening receiving the hook,
   (g) vent means releasably connected to the bag and extending through a wall of the silo to the outside thereof to expose the interior of the bag to atmospheric pressure, and
   (h) a flexible elongated member disposed in engagement with the bag and extending beneath the bag and then upwardly to a location adjacent said central opening whereby release of the vent means from the bag and pulling on said flexible member will move the movable members radially inward along said tracks and pull the breather bag inwardly toward the center of the silo where the bag can be removed from the central opening.

2. The structure of claim 1 and including
   (a) locking means for selectively preventing movement of said movable members on said rails whereby pulling on said flexible member when said locking means is engaged will prevent movement of the breather bag along said rails and will cause the bag to be drawn upwardly against the roof, and a normally closed filler opening located adjacent the locking means so that the locking means may be manually disengaged through the filler opening whereby pulling on said flexible member when said locking means is disengaged will move the movable members along said rails and pull the breather bag toward the opening in the roof where the bag can be removed.

3. In a storage structure,
   (a) a silo,
   (b) a roof enclosing the upper end of the silo and having a central opening therein,
   (c) a breather bag located in the upper portion of the silo and having an interior and exterior surface, one of said surfaces being exposed to the pressure of the interior of the silo and the other of said surfaces being exposed to atmospheric pressure,
   (d) a series of guide tracks connected to the roof and extending radially from the outer periphery of the roof toward the center thereof,
   (e) a movable member mounted for movement on each track,
   (f) a yoke member connected to the upper portion of said breather bag, one of said members having a hook and the other of said members having an opening to receive the hook,
   (g) a flexible elongated member disposed in engagement with the bag and extending beneath the bag and then upwardly to a location adjacent said central opening, and
   (h) locking means interconnecting the movable members and the rails for selectively locking the movable members to said rails, said locking means when in the locking position preventing inward movement of the breather bag toward the center of the silo and causing the bag to be drawn upwardly against the roof by pulling on said flexible member.

4. The structure of claim 1, in which
   (a) the roof is formed of a series of radially extending segments and the radially extending edges of a plurality of segments are provided with depending flanges which form said tracks.

5. A storage structure, comprising
   (a) a substantially air-tight vessel including a roof and side wall and having normally closed central filler opening means therein for filling the vessel with the material to be stored,
   (b) elongated support means extending radially inside said roof from the central filler opening to the side wall of the vessel,
   (c) suspending means slidably supporting a breather bag from the support means and said breather bag being exposed to the pressures in the interior of the vessel,
   (d) a vent releasably connected to the bag and extending to the exterior of the vessel to expose the bag to atmospheric pressures,
   (e) said suspending means engaging the support means and locking the bag to said support means and adapted to be manually unlocked through the filler means, and
   (f) a flexible member engaged with the breather bag and extending from beneath the bag and along the support means, whereby pulling on the flexible member when the locking means is locked will cause the bag to be lifted upwardly toward the roof, and when the locking means has been manually unlocked and the vent connection released pulling on the flexible member will slide the breather bag toward the filler opening means for removal of the bag from the structure.

6. In a storage structure,
 (a) a substantially air-tight silo including a side wall and roof with an opening in the roof for filling the storage structure with the material to be stored,
 (b) track means on the interior of the silo and extending from substantially the center of the roof to the side wall of the silo,
 (c) a breather bag located in the upper portion of the silo beneath the roof and serving to balance the pressure between the interior and exterior of the silo,
 (d) vent means releasably connected to the bag and extending through a wall of the silo to the outside thereof to expose the interior of the bag to atmospheric pressure,
 (e) a single yoke member secured to the upper portion of the bag generally centrally thereof when the bag is expanded and extending substantially the length of said bag,
 (f) sliding means interconnecting the yoke member to the track means, and
 (g) a series of flexible members attached to the bag at spaced locations throughout the length of the breather bag, said flexible members extending to a position adjacent said opening whereby pulling on said flexible members at the location of the opening will draw the breather bag upwardly towards the roof to a location where it will not interfere with filling of the silo with the material to be stored.

7. The structure of claim 6 in which the yoke member has an upstanding portion projecting upwardly from the bag, and the sliding means is connected to the upstanding portion of the yoke member and to the track means at a plurality of locations.

References Cited by the Examiner

UNITED STATES PATENTS

| | | | |
|---|---|---|---|
| 1,690,072 | 10/28 | Johnson | 220—85 |
| 2,643,602 | 6/53 | Martin | 220—85 |
| 3,016,814 | 1/62 | Beach | 99—235 |

RICHARD W. COOKE, JR., *Primary Examiner.*

JACOB L. NACKENOFF, *Examiner.*

UNITED STATES PATENT OFFICE
CERTIFICATE OF CORRECTION

Patent No. 3,193,058                      July 6, 1965

James H. Ebbinghaus

It is hereby certified that error appears in the above numbered patent requiring correction and that the said Letters Patent should read as corrected below.

Column 7, line 20, for "sliding" read -- movable --.

Signed and sealed this 28th day of December 1965.

(SEAL)
Attest:

ERNEST W. SWIDER                      EDWARD J. BRENNER
Attesting Officer                      Commissioner of Patents